United States Patent [19]
Toyama

[11] Patent Number: 6,043,939
[45] Date of Patent: Mar. 28, 2000

[54] THREE-GROUP ZOOM LENS

[75] Inventor: Nobuaki Toyama, Omiya, Japan

[73] Assignee: Fuji Photo Optical Co., Ltd., Omiya, Japan

[21] Appl. No.: 09/252,804

[22] Filed: Feb. 19, 1999

[30] Foreign Application Priority Data

Mar. 3, 1998 [JP] Japan .............................. H10-067760

[51] Int. Cl.$^7$ .............................................. G02B 15/14
[52] U.S. Cl. ......................... 359/689; 359/676; 359/684; 359/791
[58] Field of Search ................. 359/676, 683, 359/686, 689, 708, 739–740, 791, 779

[56] References Cited

U.S. PATENT DOCUMENTS

| | | | |
|---|---|---|---|
| 4,978,204 | 12/1990 | Ito | 350/423 |
| 5,138,493 | 8/1992 | Iwasaki | 359/689 |
| 5,379,154 | 1/1995 | Shibayama et al. | 359/689 |
| 5,592,334 | 1/1997 | Oshikiri et al. | 359/689 |
| 5,715,096 | 2/1998 | Meyers | 359/689 |
| 5,726,810 | 3/1998 | Meyers | 359/684 |

FOREIGN PATENT DOCUMENTS

H9-33813  2/1997  Japan .

*Primary Examiner*—Georgia Epps
*Assistant Examiner*—David N. Spector
*Attorney, Agent, or Firm*—Arnold International; Bruce Y. Arnold

[57] ABSTRACT

A three-group zoom lens having positive, positive and negative refractive power, in order from the object side. A diaphragm is positioned between the first and second lens groups and nearest the second lens group. Zooming is performed by changing the spacings between the lens groups such that, when power is varied from the wide-angle end to the telephoto end, the distance between the first lens group $G_1$ and the second lens group $G_2$ increases, while the distance between the second lens group and the third lens group $G_3$ decreases. The second lens group includes, in order from the object side, a meniscus lens element $L_4$ having negative refractive power with its concave surface on the object side, a biconvex lens element $L_5$, a negative lens element $L_6$ and a biconvex lens element $L_7$. In addition, the three-group zoom lens satisfies certain conditions in order to obtain favorable correction of aberrations over the entire range of zoom, thereby providing high resolution and contrast for all object distances.

9 Claims, 15 Drawing Sheets

EMBODIMENT 1

EMBODIMENT 2

EMBODIMENT 3

EMBODIMENT 4

EMBODIMENT 5

THREE-GROUP ZOOM LENS

BACKGROUND OF THE INVENTION

As a lens system used for lens shutter cameras, a zoom lens of high variable power has recently been produced, and in particular, a zoom lens of variable power of threefold or more has been desired. As for such a zoom lens, the one disclosed in Japanese Laid-Open Patent Application H09-33813 is well-known. This zoom lens has a low f-number of about 3.7, and thus provides a bright image while favorably correcting various aberrations.

However, in the zoom lens of the above-noted laid-open patent application, there have been problems not only in that the image angle at the wide-angle end is only 58 degrees, but also in that the overall length of the zoom lens when at the telephoto end is large. Therefore, a zoom lens has been desired that has a wide image angle at the wide-angle end, has a short overall length at the telephoto end, and exhibits excellent optical performance.

BRIEF SUMMARY OF THE INVENTION

The present invention relates to a three-group zoom lens that is suited for lens shutter cameras, video cameras and the like, and particularly relates to a zoom lens having variable power of threefold or more as a result of properly designing the lens elements of each lens group.

A first object of the invention is to provide a compact three-group zoom lens that not only has a wide image angle but also has a brighter image at the wide-angle end than previously available. A second object of the invention is to provide such a lens with a short overall length at the telephoto end. A third object of the invention is to provide such a lens with low aberrations over the entire range of zoom, so that the zoom lens has a high resolution and a high contrast.

More specifically, the present invention provides a three-group zoom lens having an image angle of 70 degrees or more at the wide-angle end, an f-number (hereinafter $F_{NO}$) less than 10 at the telephoto end, and a variable power ratio of 3.6 or more.

BRIEF DESCRIPTION OF THE DRAWINGS

The present invention will become more filly understood from the detailed description given below and the accompanying drawings, which are given by way of illustration only and thus are not limitative of the present invention, wherein.

DETAILED DESCRIPTION

Figure 1:
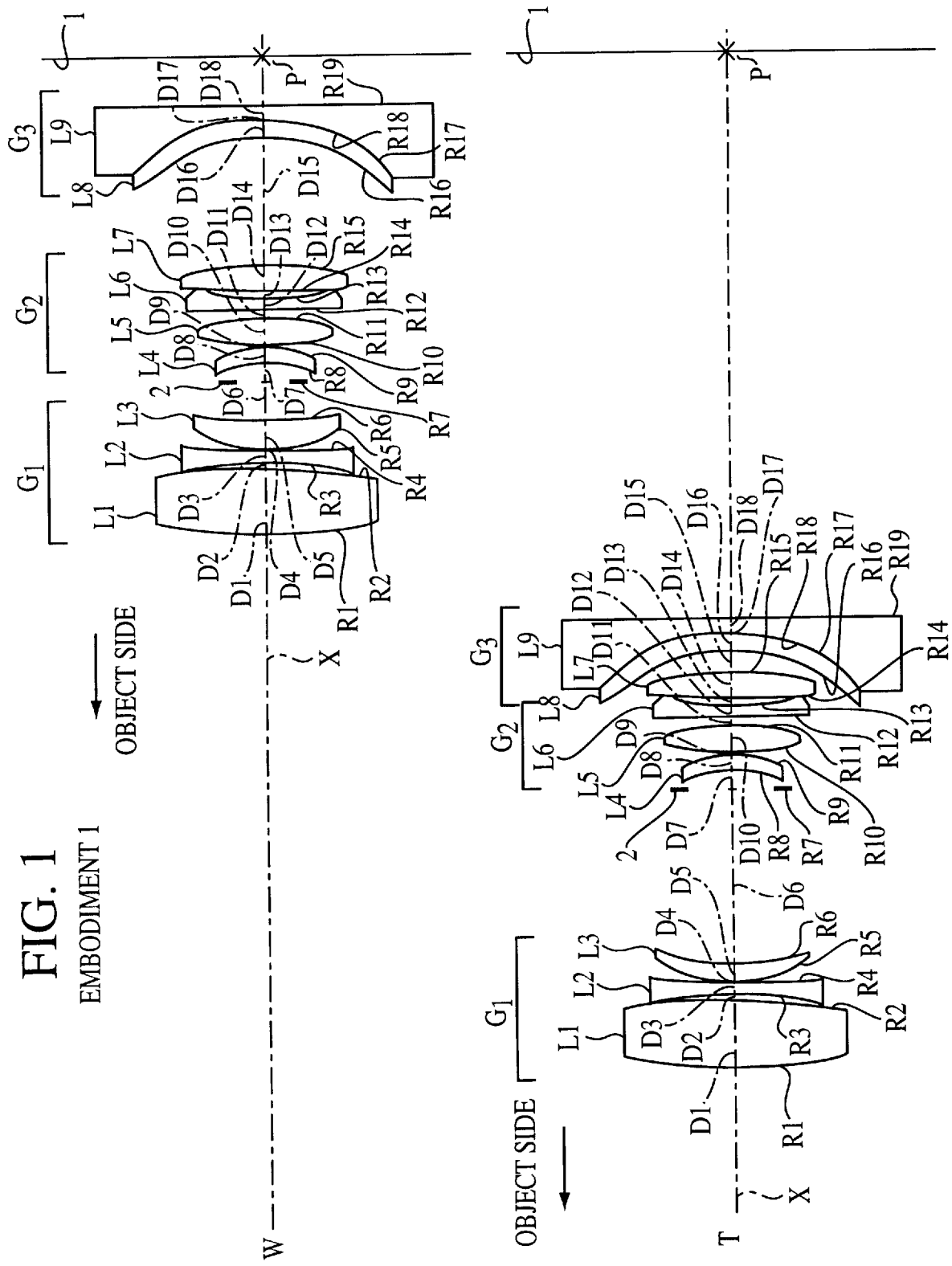
FIG. 1 shows the basic lens element structure of the zoom lens of Embodiment 1 of the present invention.

In order to accomplish the above-noted objectives, the three-group zoom lens of the present invention includes, in order from the object side: a first lens group $G_1$ of positive refractive power, a second lens group $G_2$ of positive refractive power, and a third lens group $G_3$ having negative refractive power. The zoom lens efficiently focuses luminous flux on image surface 1 located at point P along the optical axis X by shifting each lens group along the optical axis. A diaphragm 2 is arranged near the object-side surface of the lens element on the object side of the second lens group. Zooming is accomplished by varying the spacings between the lens 15, groups. When zooming from the wide-angle end to the telephoto end, the space between the first lens group and the second lens group increases, while the space between the second lens group and the third lens group decreases. The second lens group includes, in order from the object side, a meniscus lens element having negative refractive power with its concave surface on the object side, a biconvex lens element, a lens element having negative refractive power and a biconvex lens element.

It is preferred that the third lens group include a lens element having at least one aspherical surface. And, it is preferred that the lens element of second lens group that is nearest the image side has an aspherical surface. Moreover, the zoom lens of the present invention satisfies the following Conditions (1)–(3)

| | |
|---|---|
| $0.75 < R_8/f_w < -0.23$ | Condition (1) |
| $0.15 < f_2/f_t < 0.24$ | Condition (2) |
| $-0.70 < f_3/f_w < -0.43$ | Condition (3) | where $R_8$ is the radius of curvature of the object-side surface of the fourth lens element; $f_w$ is the focal length of the three-group zoom lens at the wide-angle end; $f_2$ is the focal length of the second lens group; $f_t$ is the focal length of the three-group zoom lens at the telephoto end; and $f_3$ is the focal length of the third lens group.

The technical significance of each Condition above will now be explained. First, when the upper limit of Condition (1) is surpassed, coma increases and becomes difficult to correct; on the other hand, below the lower limit of Condition (1), coma and curvature of field increase and become difficult to correct.

Also, when the upper limit of Condition (2) is surpassed, coma and curvature of field increase and become difficult to correct. On the other hand, below the lower limit of Condition (2), coma increases and becomes difficult to correct.

Moreover, when the upper limit of Condition (3) is surpassed, coma and curvature of field increase and become difficult to correct; on the other hand, below the lower limit of Condition (3), coma increases and becomes difficult to correct.

According to the present embodiment, by employing the above-noted lens elements and by satisfying the Conditions mentioned above, various aberrations over the zoom range are favorably corrected, thereby providing high imaging quality for all possible object distances.

Five specific embodiments of the present invention will now be explained with reference to the drawings.

Embodiment 1

FIG. 1 illustrates the basic lens element structure of Embodiment 1 and illustrates the lens group positions of the three-group zoom lens at both the wide-angle end W and the telephoto end T. The first lens group $G_1$ includes, in order from the object side, a biconvex first lens element $L_1$, a biconcave second lens element $L_2$, and a third lens element $L_3$ having a positive meniscus shape with its convex surface on the object side.

The second lens group $G_2$ includes, in order from the object side, a fourth lens element $L_4$ having a negative meniscus shape with its concave surface on the object side, a biconvex fifth lens element $L_5$, a biconcave sixth lens element $L_6$, and a biconvex seventh lens element $L_7$. Also, a diaphragm 2 is arranged on the object side of the second lens group $G_2$.

The third lens group $G_3$ includes, in order from the object side, an eighth lens element $L_8$ having a negative meniscus shape with its concave surface on the object side, and a ninth lens element $L_9$ having a negative meniscus shape with its concave surface on the object side.

In addition, both surfaces ($R_{14}$ and $R_{15}$) of the above-noted seventh lens element $L_7$ and both surfaces ($R_{16}$ and $R_{17}$) of the above-noted eighth lens element $L_8$ are aspherical, and the various aberrations are made favorable.

Table 1 below shows the surface number #, in order from the object side, the radius of curvature R (in mm) of each surface, the on-axis spacing D (in mm) of each surface, as well as the refractive index $N_d$ and Abbe constant $v_d$ (at the sodium d line) of each lens element of Embodiment 1. Those surfaces with a * to the right of the surface number in Table 1 are aspherical surfaces, and the aspherical surface shape is expressed by Equation (A) below.

$$Z = Ch^2/\{1+(1-KC^2h^2)^{1/2}\} + a_4 h^4 + a_6 h^6 + a_8 h^8 + a_{10} h^{10} \quad \text{(Equation A)}$$

where

Z is the length (in mm) of a line drawn from a point on the aspherical surface at height h from the optical axis to the tangential plane of the aspherical surface vertex, C (=1/R) is the curvature of the aspherical surface near the optical axis, h is the height (in mm) from the optical axis, K is the eccentricity, and $a_4$, $a_6$, $a_8$, and $a_{10}$ are the 4th, 6th, 8th, and 10th aspherical coefficients.

The mid-section of Table 1 shows, at the wide-angle end W and the telephoto end T, the value of $D_6$ (the distance between the first lens group $G_1$ and the diaphragm 2), and the value of $D_6$, (the distance between the second lens group $G_2$ and the third lens group $G_3$).

Moreover, the focal length f, and the $F_{NO}$ of the three-group zoom lens at the wide-angle end W and the telephoto end T are as shown in the bottom section of Table 1. In addition, the image angle 2 ω at the wide-angle end is 70.4°.

TABLE 1

| # | R | D | $N_d$ | $v_d$ |
|---|---|---|---|---|
| 1 | 33.366 | 4.55 | 1.57698 | 40.6 |
| 2 | −48.979 | 0.35 | | |
| 3 | −31.251 | 1.03 | 1.83400 | 29.9 |
| 4 | 109.027 | 0.10 | | |
| 5 | 9.890 | 1.06 | 1.49000 | 62.3 |
| 6 | 18.073 | $D_6$ | | |
| 7 | ∞ | 1.45 | | |
| 8 | −7.569 | 1.00 | 1.58583 | 61.7 |
| 9 | −10.746 | 0.10 | | |
| 10 | 15.551 | 1.99 | 1.43749 | 70.4 |
| 11 | −16.559 | 0.72 | | |
| 12 | −318.548 | 1.00 | 1.83400 | 28.0 |
| 13 | 24.285 | 0.40 | | |
| 14* | 83.925 | 1.66 | 1.78351 | 25.8 |
| 15* | −21.065 | $D_{15}$ | | |
| 16* | −8.448 | 1.01 | 1.49023 | 57.5 |
| 17* | −15.226 | 0.14 | | |
| 18 | −12.291 | 1.00 | 1.68813 | 57.1 |
| 19 | −350.071 | | | |

| | W | T |
|---|---|---|
| $D_6$ | 3.49 | 12.40 |
| $D_{15}$ | 8.94 | 1.68 |
| f = 23.83–87.30 | $F_{NO}$ = 5.7–9.6 | |

The values of each of the constants K and $a_4$–$a_{10}$ of the aspherical surfaces indicated in Table 1 are shown in Table 2.

TABLE 2

| # | K | $a_4$ | $a_6$ | $a_8$ | $a_{10}$ |
|---|---|---|---|---|---|
| 14 | 1.0052914 | −0.8132990 × 10$^{-4}$ | −0.2019424 × 10$^{-6}$ | −0.4034580 × 10$^{-8}$ | −0.2613500 × 10$^{-10}$ |
| 15 | 0.7137453 | 0.5392107 × 10$^{-4}$ | 0.3418549 × 10$^{-6}$ | 0.7225541 × 10$^{-8}$ | 0.5483224 × 10$^{-10}$ |
| 16 | −0.5653520 | 0.3673472 × 10$^{-4}$ | 0.1468350 × 10$^{-6}$ | −0.4638741 × 10$^{-8}$ | −0.9780608 × 10$^{-10}$ |
| 17 | 1.3636807 | −0.3604812 × 10$^{-4}$ | −0.3494592 × 10$^{-6}$ | −0.2384278 × 10$^{-8}$ | −0.6824539 × 10$^{-10}$ |

Embodiment 2

Figure 2:
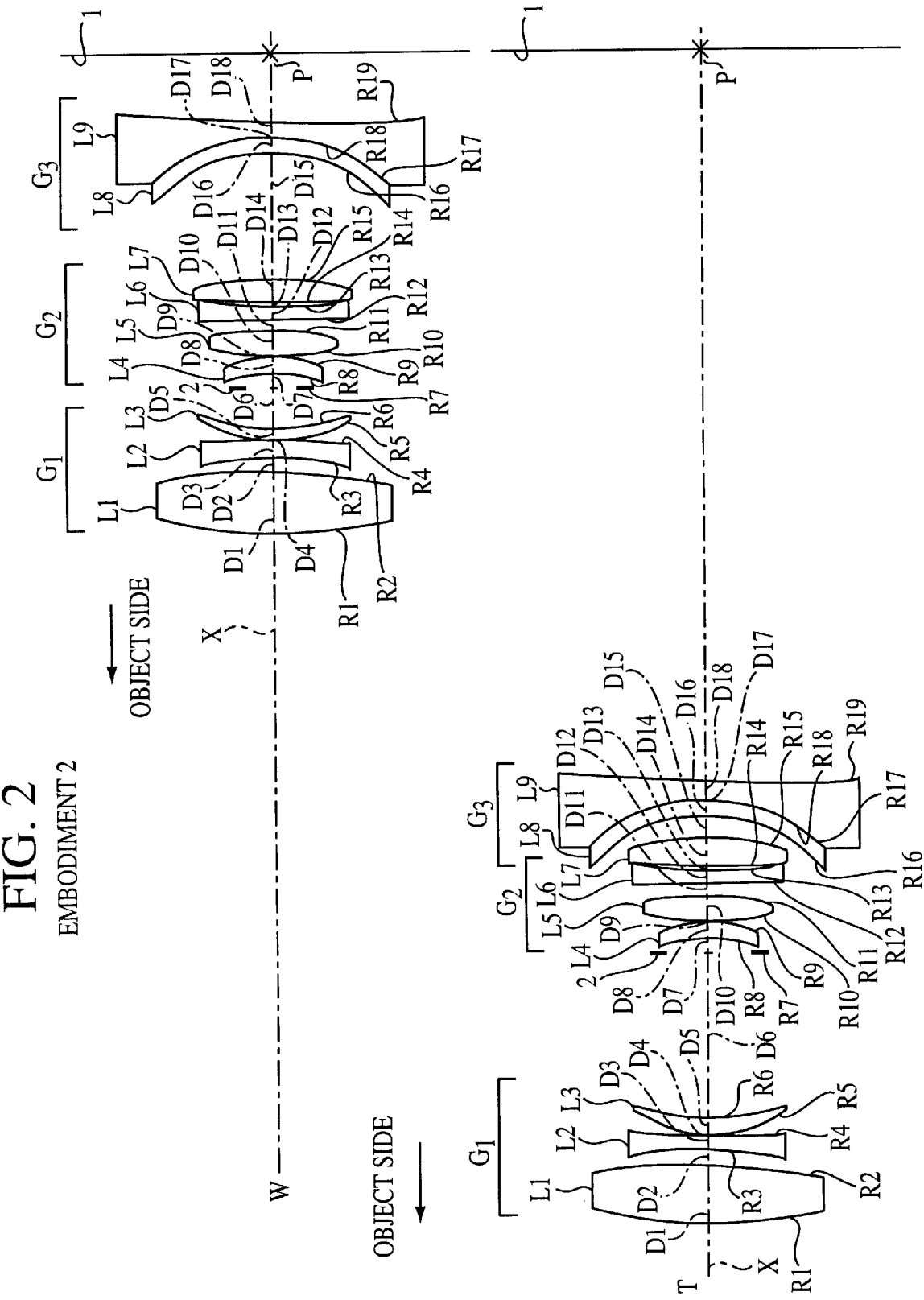
FIG. 2 shows the basic lens element structure of the zoom lens of Embodiment 2 of the present invention.

The three-group zoom lens of Embodiment 2 has roughly the same lens element structure as in Embodiment 1, except, as illustrated in FIG. 2, the ninth lens element L, is biconcave.

Table 3, below, shows the surface number #, in order from the object side, the radius of curvature R (in mm) of each surface, the on-axis spacing D (in mm) of each surface, as well as the refractive index $N_d$ and Abbe constant $v_d$ (at the sodium d line) of each lens element of Embodiment 2. Those surfaces with a * to the right of the surface number in Table 3 are aspherical surfaces, and the aspherical surface shape is expressed by Equation (A) above.

The mid-section of Table 3 shows, at the wide-angle end W and the telephoto end T, the value of $D_6$ (the distance between the first lens group $G_1$ and the diaphragm 2), and the value of $D_{15}$ (the distance between the second lens group $G_2$ and the third lens group $G_3$).

Moreover, the focal length f, and the $F_{NO}$ of the three-group zoom lens at the wide-angle and the telephoto end T are as shown in the bottom section of Table 3. In addition, the angle 2 ω at the wide-angle end is 71.6°.

TABLE 3

| # | R | D | $N_d$ | $v_d$ |
|---|---|---|---|---|
| 1 | 36.641 | 4.48 | 1.56006 | 43.9 |
| 2 | −51.728 | 1.10 | | |
| 3 | −28.101 | 1.00 | 1.83237 | 38.1 |
| 4 | 71.701 | 0.10 | | |
| 5 | 9.630 | 1.00 | 1.49078 | 62.0 |
| 6 | 16.536 | $D_6$ | | |
| 7 | ∞ | 1.31 | | |
| 8 | −7.321 | 1.00 | 1.51117 | 64.2 |
| 9 | −10.713 | 0.10 | | |
| 10 | 15.692 | 2.27 | 1.48749 | 70.4 |
| 11 | −16.380 | 0.56 | | |
| 12 | −650.774 | 1.00 | 1.83400 | 23.3 |
| 13 | 28.169 | 0.50 | | |
| 14* | 102.170 | 1.77 | 1.77554 | 29.4 |
| 15* | −17.915 | $D_{15}$ | | |
| 16* | −9.277 | 1.00 | 1.49023 | 57.5 |
| 17* | −14.553 | 0.10 | | |
| 18 | −12.882 | 1.00 | 1.61840 | 60.4 |
| 19 | 205.326 | | | |

| | W | T |
|---|---|---|
| $D_6$ | 3.00 | 11.94 |
| $D_{15}$ | 8.91 | 1.75 |
| f = 23.81–87.40 | | $F_{NO}$ = 5.7–9.6 |

Table 4 shows the values of K, $a_4$, $a_6$, $a_8$ and $a_{10}$ in Equation (A), above, for the aspherical surfaces indicated in Table 3.

TABLE 4

| # | K | $a_4$ | $a_6$ | $a_8$ | $a_{10}$ |
|---|---|---|---|---|---|
| 14 | 1.0055163 | −0.7400820 × $10^{-4}$ | −0.1828280 × $10^{-6}$ | −0.3529491 × $10^{-8}$ | −0.2186553 × $10^{-10}$ |
| 15 | 0.7306247 | 0.5001755 × $10^{-4}$ | 0.3144153 × $10^{-6}$ | 0.6444481 × $10^{-8}$ | 0.4768616 × $10^{-10}$ |
| 16 | −0.4029744 | 0.3190526 × $10^{-4}$ | 0.7977442 × $10^{-7}$ | −0.5269055 × $10^{-8}$ | −0.1078765 × $10^{-9}$ |
| 17 | 1.2973360 | −0.3196388 × $10^{-4}$ | −0.2699297 × $10^{-6}$ | −0.9708231 × $10^{-9}$ | −0.3817359 × $10^{-10}$ |

Embodiment 3

Figure 3:
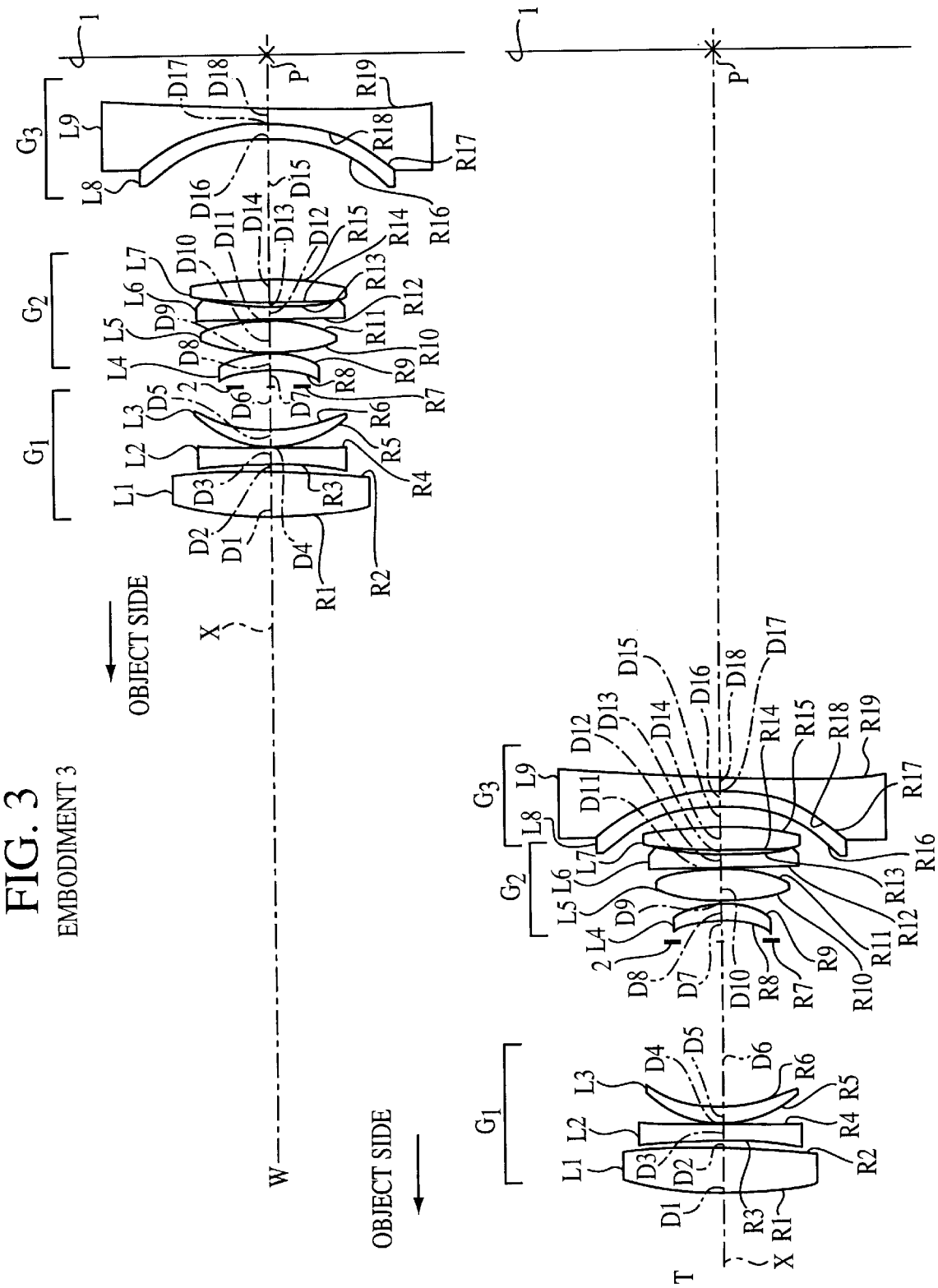
FIG. 3 shows the basic lens element structure of the zoom lens of Embodiment 3 of the present invention.

The three-group zoom lens of Embodiment 3 is similar in lens element structure to Embodiment 2, in that the ninth lens element $L_9$ is biconcave, as shown in FIG. 3. Table 5, below, shows the surface number #, in order from the object side, the radius of curvature R (in mm) of each surface, the on-axis spacing D (in mm) of each surface, as well as the refractive index $N_d$ and Abbe constant $v_d$ (at the sodium d line) of each lens element of Embodiment 3. Those surfaces with a * to the right of the surface number in Table 5 are aspherical surfaces, and the aspherical surface shape is expressed by Equation (A) above.

The mid-section of Table 5 shows, at the wide-angle end W and the telephoto end T, the value of $D_6$ (the distance between the first lens group $G_1$ and the diaphragm 2), and the value of $D_{15}$ (the distance between the second lens group $G_2$ and the third lens group $G_3$).

Moreover, the focal length f, and the $F_{NO}$ of the three-group zoom lens at the wide-angle and the telephoto end T are as shown in the bottom section of Table 5. In addition, the angle 2 ω at the wide-angle end is 71.4°.

TABLE 5

| # | R | D | $N_d$ | vd |
|---|---|---|---|---|
| 1 | 31.123 | 3.23 | 1.66850 | 32.2 |
| 2 | −72.110 | 0.62 | | |
| 3 | −31.582 | 1.00 | 1.83400 | 27.3 |
| 4 | 70.055 | 0.10 | | |
| 5 | 8.418 | 1.15 | 1.49000 | 56.9 |
| 6 | 11.360 | $D_6$ | | |
| 7 | ∞ | 1.58 | | |
| 8 | −5.925 | 1.00 | 1.52050 | 64.2 |
| 9 | −7.552 | 0.10 | | |
| 10 | 14.617 | 2.48 | 1.48749 | 70.4 |
| 11 | −12.575 | 0.10 | | |
| 12 | −64.747 | 1.00 | 1.83400 | 29.8 |
| 13 | 34.265 | 0.33 | | |
| 14* | 143.365 | 1.42 | 1.30822 | 24.6 |
| 15* | −29.193 | $D_{15}$ | | |
| 16* | −10.585 | 1.00 | 1.49023 | 57.5 |
| 17* | −16.199 | 0.10 | | |
| 18 | −13.745 | 1.00 | 1.61187 | 60.7 |
| 19 | 183.207 | | | |

| | W | T |
|---|---|---|
| $D_6$ | 3.03 | 11.81 |
| $D_{15}$ | 10.16 | 1.60 |
| f = 23.84–87.41 | | $F_{NO}$ = 5.7–9.6 |

Table 6 shows the values of K, $a_4$, $a_6$, $a_8$ and $a_{10}$ in Equation (A), above, for the aspherical surfaces indicated in Table 5.

TABLE 6

| # | K | $a_4$ | $a_6$ | $a_8$ | $a_{10}$ |
|---|---|---|---|---|---|
| 14 | 1.0052557 | −0.8123454 × $10^{-4}$ | −0.3028719 × $10^{-6}$ | −0.5076391 × $10^{-8}$ | −0.3201171 × $10^{-10}$ |
| 15 | 0.7214439 | 0.5084662 × $10^{-4}$ | 0.4788426 × $10^{-6}$ | 0.8285935 × $10^{-8}$ | 0.5741405 × $10^{-10}$ |
| 16 | −0.5103492 | 0.3297583 × $10^{-4}$ | 0.2533834 × $10^{-7}$ | −0.4571333 × $10^{-8}$ | −0.1111572 × $10^{-9}$ |
| 17 | 1.2373835 | −0.2626993 × $10^{-4}$ | −0.1704253 × $10^{-6}$ | −0.2004114 × $10^{-8}$ | −0.3486062 × $10^{-10}$ |

Embodiment 4

Figure 4:
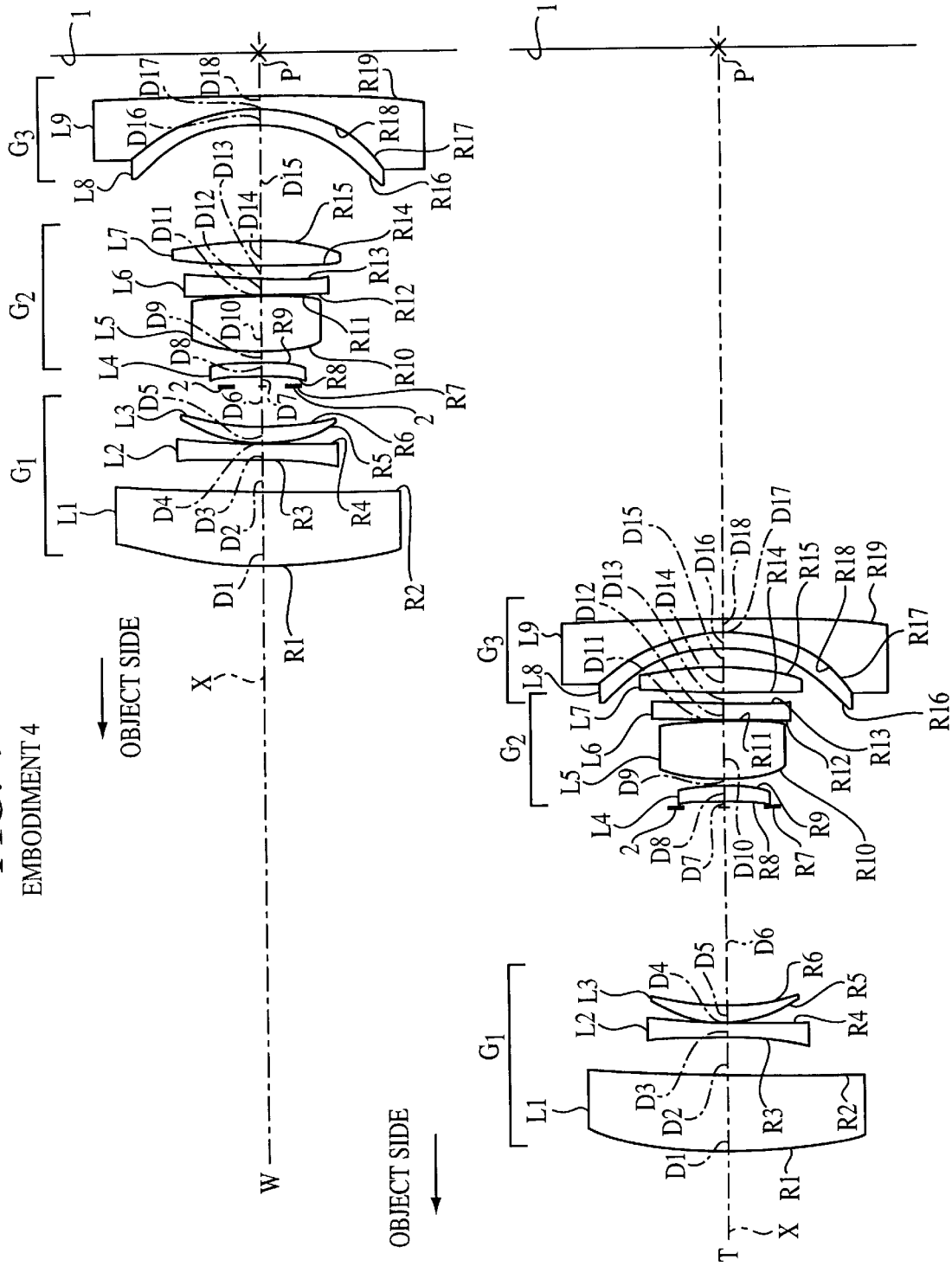
FIG. 4 shows the basic lens element structure of the zoom lens of Embodiment 4 of the present invention.

As shown in FIG. 4, the three-group zoom lens of Embodiment 4 has the same basic lens element structure as that of Embodiment 1.

Table 7, below, shows the surface number #, in order from the object side, the radius of curvature R (in mm) of each surface, the on-axis spacing D (in mm) of each surface, as well as the refractive index $N_d$ and Abbe constant $v_d$ (at the sodium d line) of each lens element of Embodiment 4. Those surfaces with a * to the right of the surface number in Table 7 are aspherical surfaces, and the aspherical surface shape is expressed by Equation (A) above.

The mid-section of Table 7 shows, at the wide-angle end W and the telephoto end T, the of $D_6$ (the distance between the first lens group $G_1$ and the diaphragm 2), and the value of the distance between the second lens group $G_2$ and the third lens group $G_3$).

Moreover, the focal length f, and the $F_{NO}$ of the three-group zoom lens at the wide-angle and the telephoto end T are as shown in the bottom section of Table 7. In addition, the angle 2 ω at the wide-angle end is 70.4°.

Embodiment 5

Figure 5:
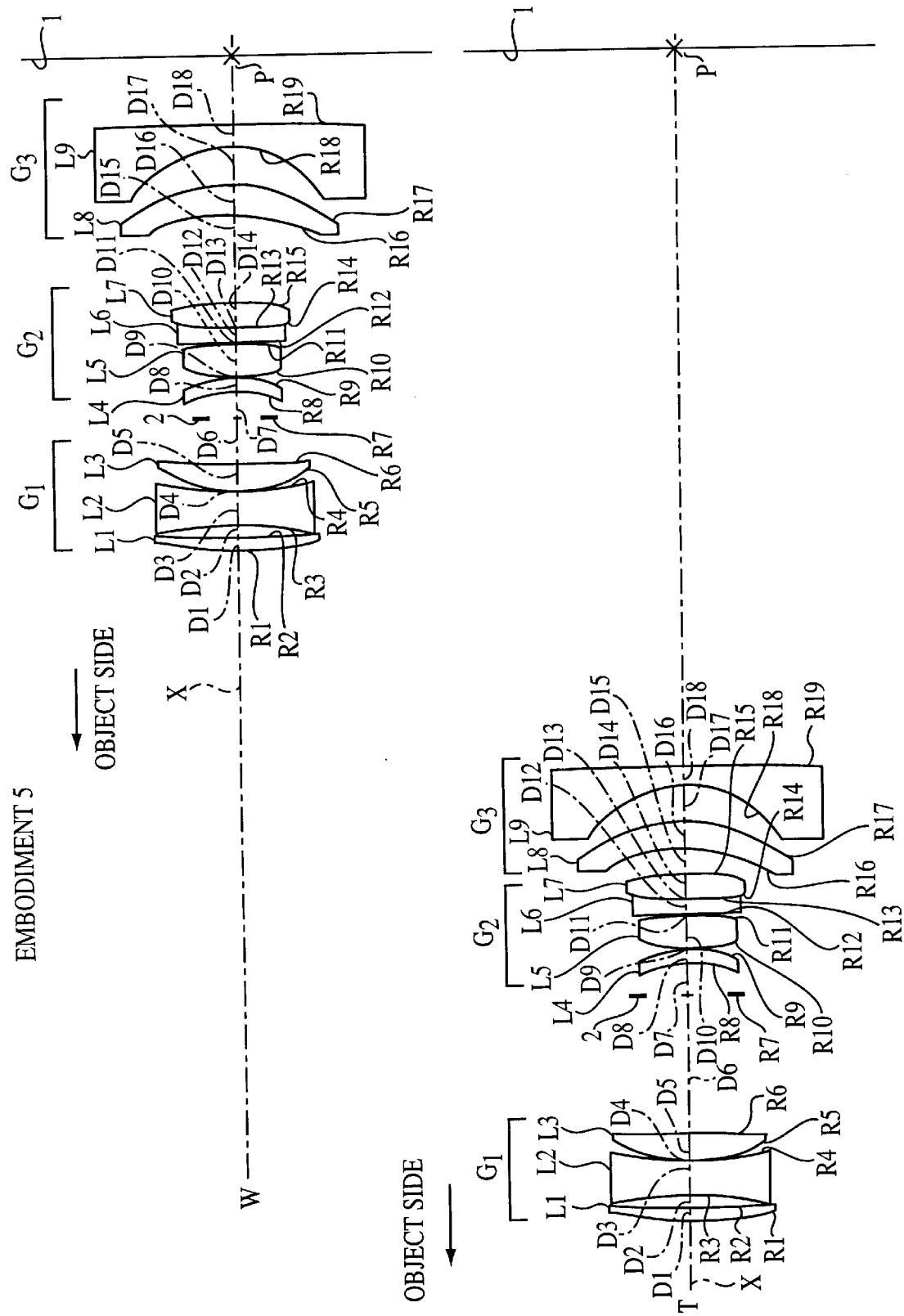
FIG. 5 shows the basic lens element structure of the zoom lens of Embodiment 5 of the present invention.
Figure 6:
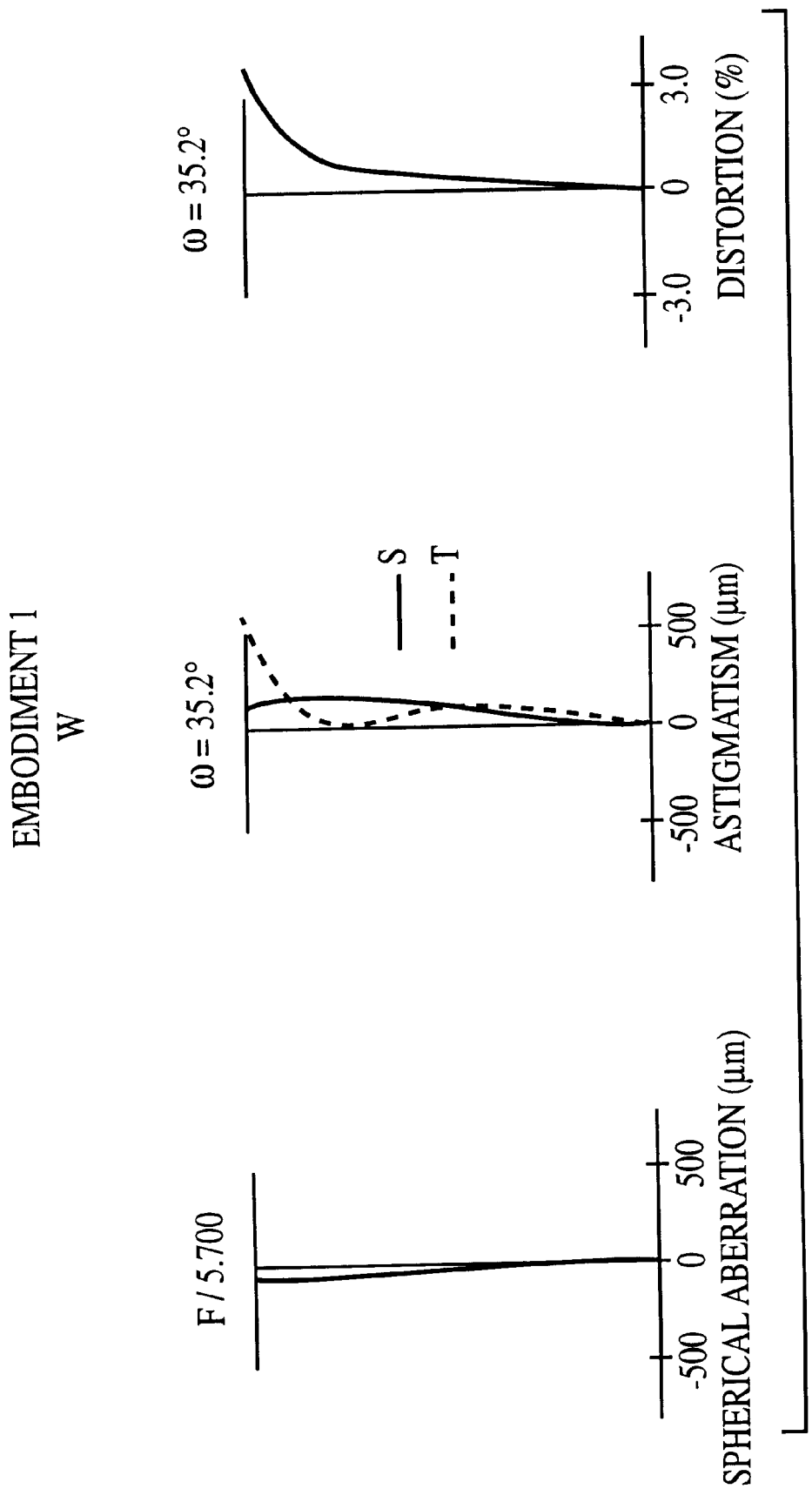
FIG. 6 shows the spherical aberration, astigmatism in the sagittal and tangential planes, and the distortion at the wide-angle end of the zoom lens of Embodiment 1.
Figure 7:
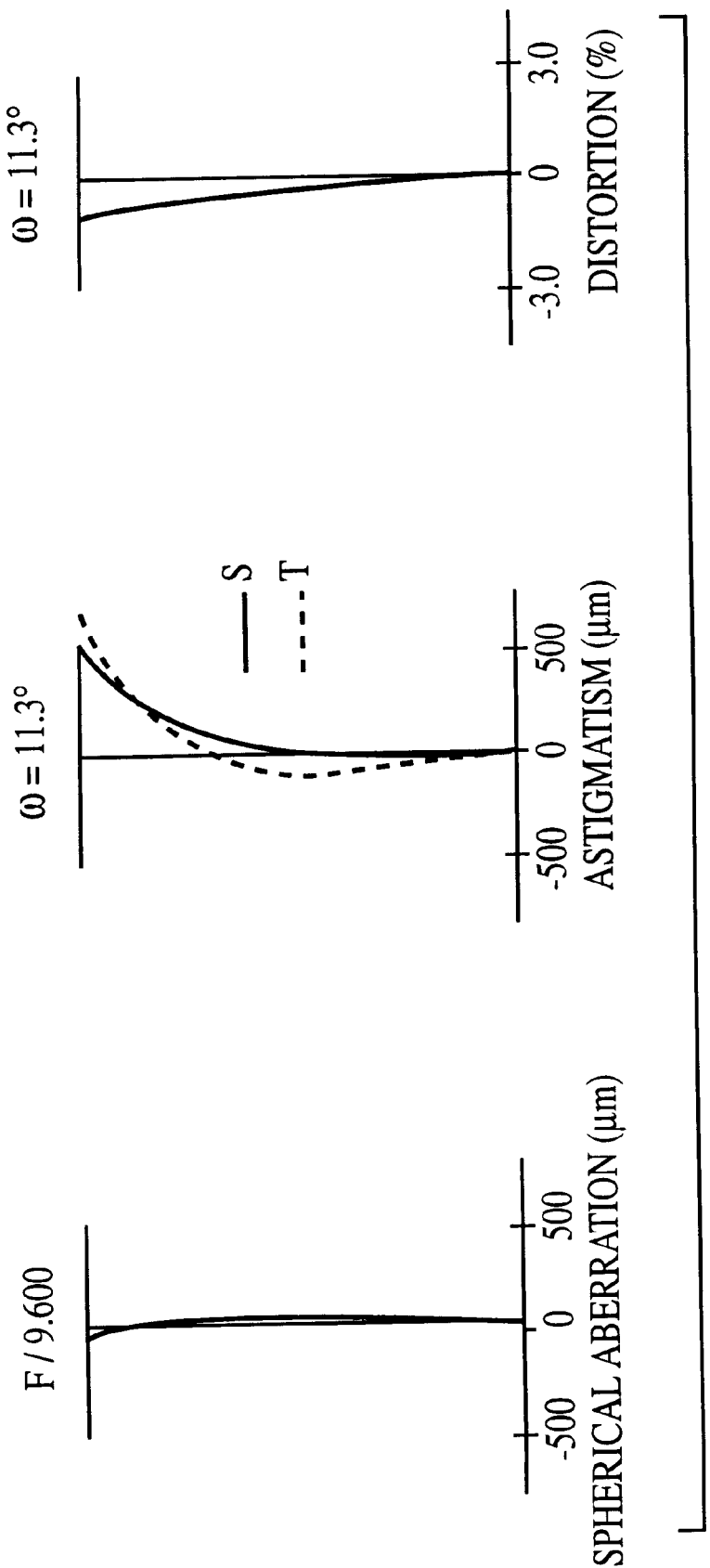
FIG. 7 shows the spherical aberration, astigmatism in the sagittal and tangential planes, and the distortion at the telephoto end of the zoom lens of Embodiment 1.
Figure 8:
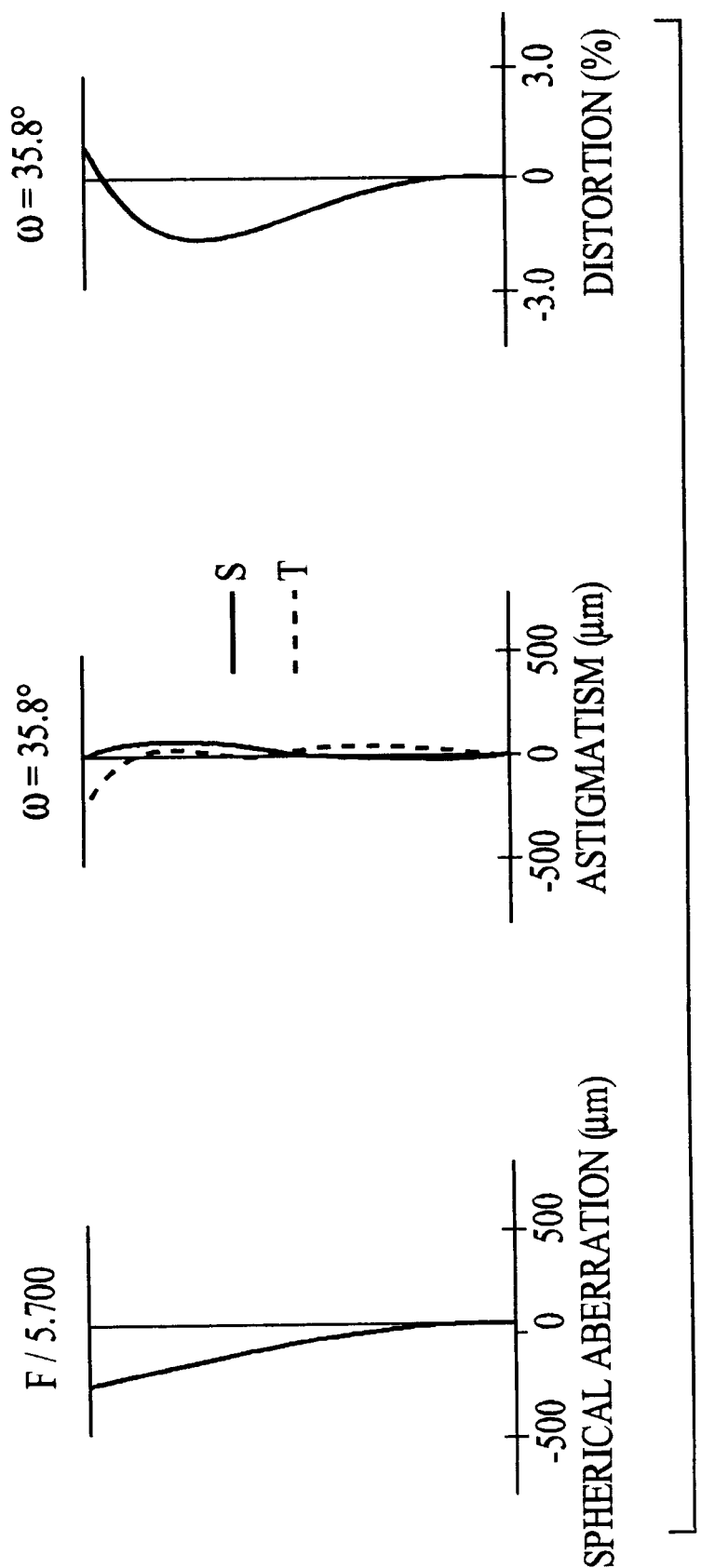
FIG. 8 shows the spherical aberration, astigmatism in the sagittal and tangential planes, and the distortion at the wide-angle end of the zoom lens of Embodiment 2.
Figure 9:
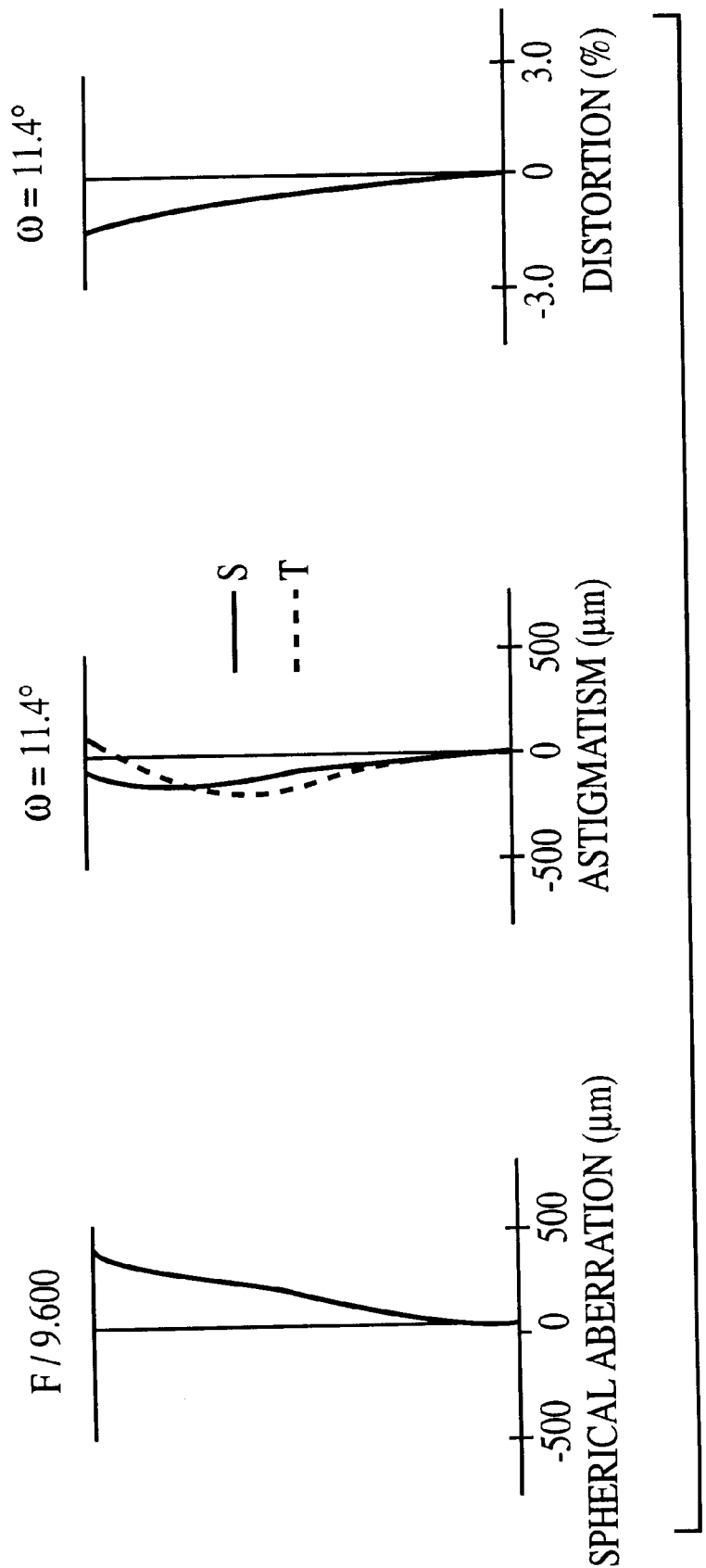
FIG. 9 shows the spherical aberration, astigmatism in the sagittal and tangential planes and the distortion at the telephoto end of the zoom lens of Embodiment 2.
Figure 10:
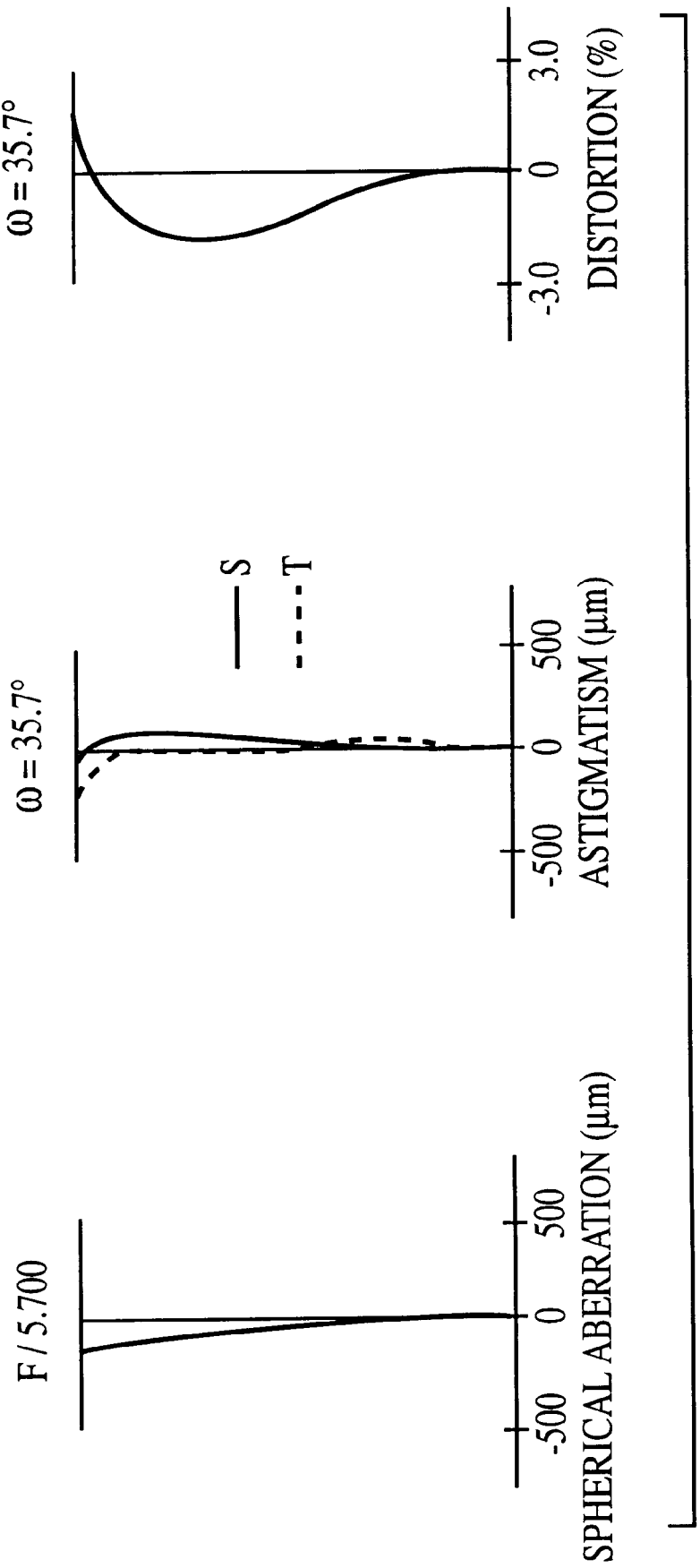
FIG. 10 shows the spherical aberration, astigmatism in the sagittal and tangential planes, and the distortion at the wide-angle end of the zoom lens of Embodiment 3.
Figure 11:
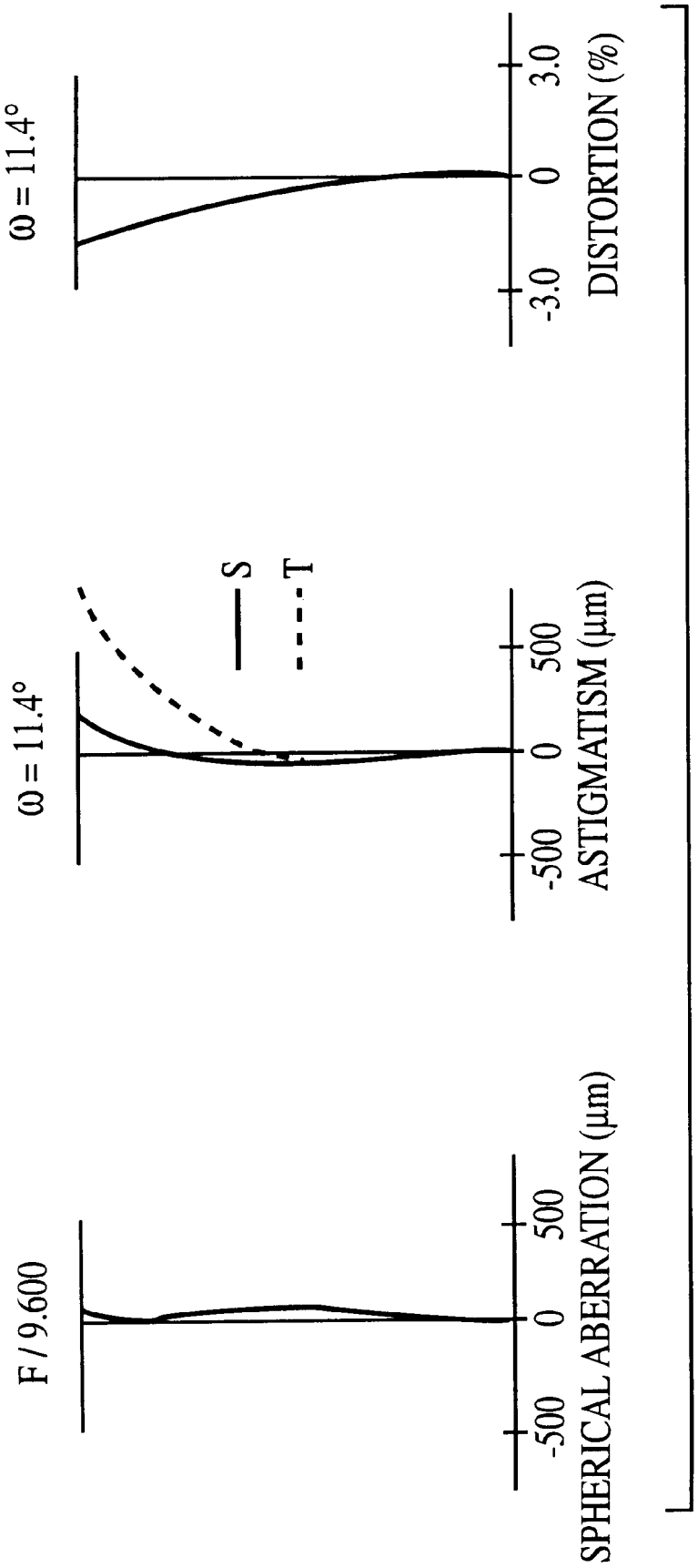
FIG. 11 shows the spherical aberration, astigmatism in the sagittal and tangential planes, and the distortion at the telephoto end of the zoom lens of Embodiment 3.
Figure 12:
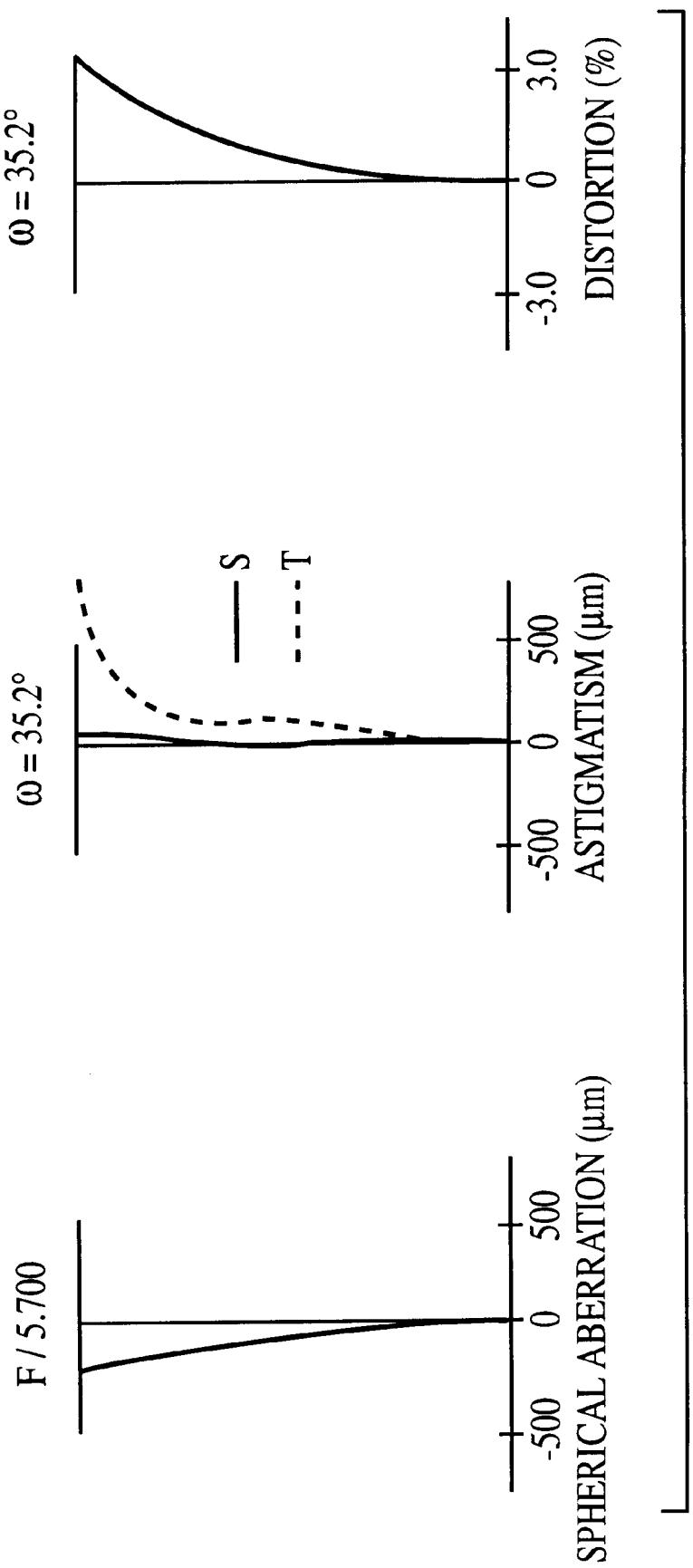
FIG. 12 shows the spherical aberration, astigmatism in the sagittal and tangential planes, and the distortion at the wide-angle end of the zoom lens of Embodiment 4.
Figure 13:
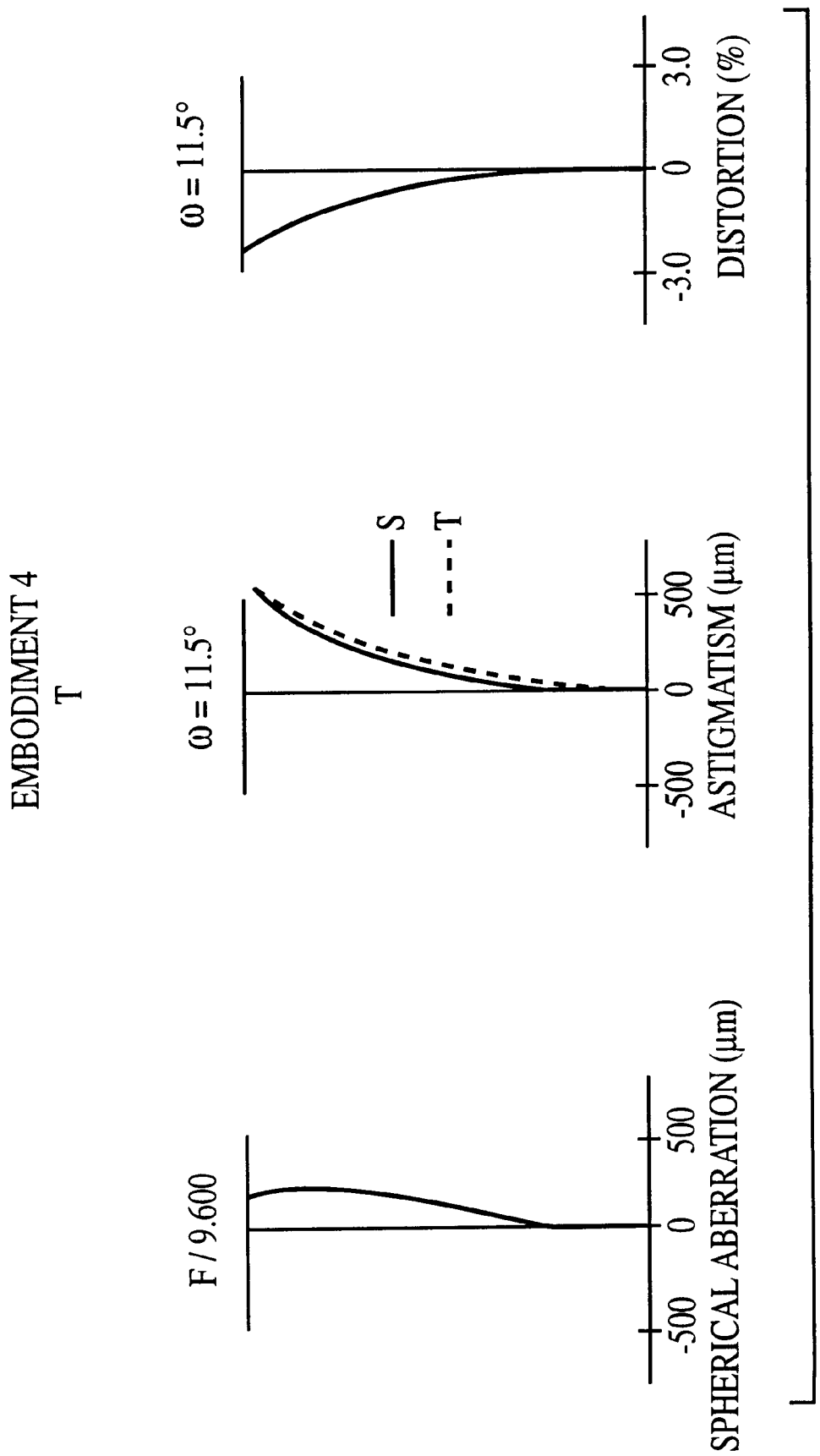
FIG. 13 shows the spherical aberration, astigmatism in the sagittal and tangential planes, and the distortion at the telephoto end of the zoom lens of Embodiment 4.
Figure 14:
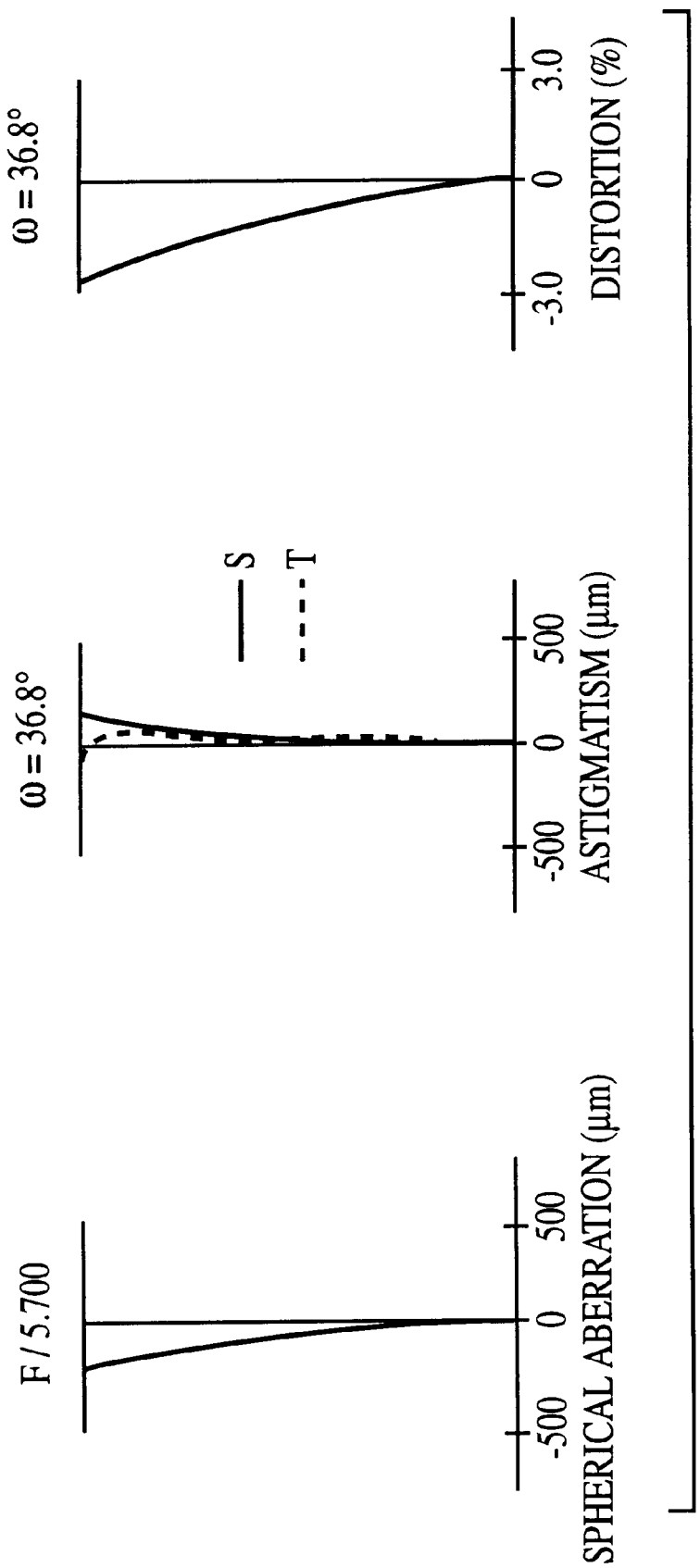
FIG. 14 shows the spherical aberration, astigmatism in the sagittal and tangential planes, and the distortion at the wide-angle end of the zoom lens of Embodiment 5.
Figure 15:
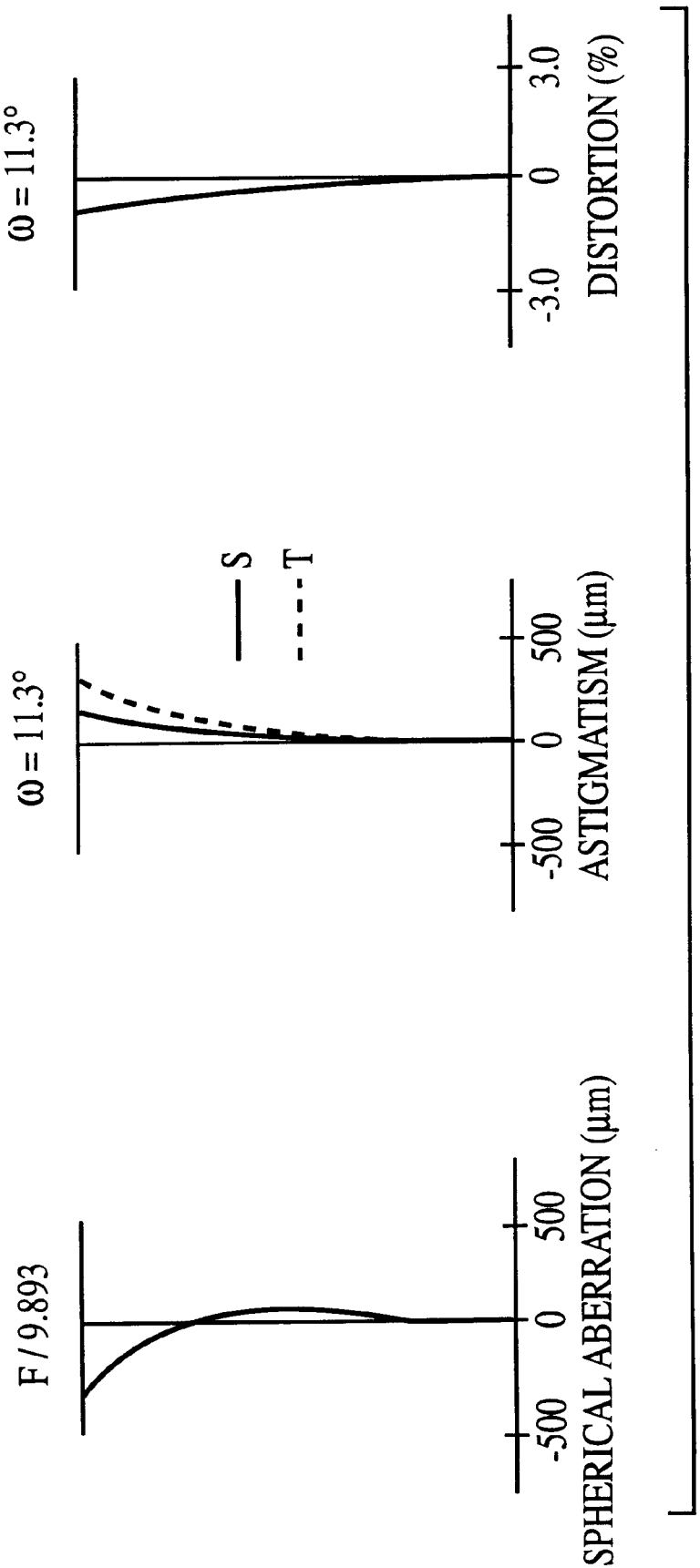
FIG. 15 shows the spherical aberration, astigmatism in the sagittal and tangential planes, and the distortion at the telephoto end of the zoom lens of Embodiment 5.

As shown in FIG. 5, the three-group zoom lens of Embodiment 5 has the same lens element structure as Embodiment 1, except that the sixth lens element $L_6$ is of negative meniscus shape with its convex surface on the object side.

Table 9, below, shows the surface number #, in order from the object side, the radius of curvature R (in mm) of each surface, the on-axis spacing D (in mm) of each surface, as well as the refractive index $N_d$ and Abbe constant $v_d$ (at the sodium d line) of each lens element of Embodiment 5. Those surfaces with a * to the right of the surface number in Table 9 are aspherical surfaces, and the aspherical surface shape is expressed by Equation (A) above.

The mid-section of Table 9 shows, at the wide-angle end W and the telephoto end T, the value of $D_6$ (the distance between the first lens group $G_1$ and the diaphragm 2), and the value of $D_{15}$(the distance between the second lens group $G_2$ and the third lens group $G_3$).

Moreover, the focal length f, and the $F_{NO}$ of the three-group zoom lens at the wide-angle W and the telephoto end T are as shown in the bottom section of Table 9. In addition, the image angle 2 ω at the wide-angle end is 73.6°.

TABLE 7

| # | R | D | $N_d$ | $v_d$ |
|---|---|---|---|---|
| 1 | 34.447 | 5.52 | 1.69994 | 30.0 |
| 2 | 496.420 | 2.34 | | |
| 3 | −38.298 | 1.11 | 1.83400 | 23.3 |
| 4 | 109.725 | 0.10 | | |
| 5 | 11.352 | 1.00 | 1.51810 | 51.6 |
| 6 | 20.873 | $D_6$ | | |
| 7 | ∞ | 0.18 | | |
| 8 | −16.590 | 1.00 | 1.83400 | 44.4 |
| 9 | −26.528 | 0.38 | | |
| 10 | 12.049 | 4.36 | 1.43749 | 70.4 |
| 11 | −41.066 | 0.11 | | |
| 12 | −201.639 | 1.00 | 1.83400 | 27.1 |
| 13 | 49.540 | 0.86 | | |
| 14* | 53.517 | 1.76 | 1.73923 | 28.0 |
| 15* | −22.517 | $D_{15}$ | | |
| 16* | −8.204 | 1.00 | 1.49023 | 57.5 |
| 17* | −14.161 | 0.10 | | |
| 18 | −12.110 | 1.00 | 1.69742 | 56.6 |
| 19 | −216.911 | | | |

| | W | T |
|---|---|---|
| $D_6$ | 3.25 | 14.08 |
| $D_{15}$ | 8.50 | 1.60 |
| f = 23.83–87.32 | | $F_{NO}$ = 5.7–9.6 |

TABLE 9

| # | R | D | $N_d$ | $v_d$ |
|---|---|---|---|---|
| 1 | 28.717 | 1.00 | 1.83400 | 23.3 |
| 2 | 246.598 | 0.63 | | |
| 3 | −34.250 | 2.50 | 1.83400 | 32.8 |
| 4 | 19.452 | 0.10 | | |
| 5 | 10.588 | 1.89 | 1.49000 | 65.4 |
| 6 | 167.307 | $D_6$ | | |
| 7 | ∞ | 1.91 | | |
| 8 | −7.153 | 1.00 | 1.73516 | 54.5 |
| 9 | −10.548 | 0.10 | | |
| 10 | 12.048 | 2.38 | 1.49000 | 65.4 |
| 11 | −21.995 | 0.10 | | |
| 12 | 120.864 | 1.00 | 1.83400 | 26.0 |
| 13 | 15.714 | 0.18 | | |
| 14* | 20.456 | 2.17 | 1.63071 | 34.9 |
| 15* | −13.215 | $D_{15}$ | | |
| 16* | −10.978 | 2.00 | 1.49588 | 65.2 |
| 17* | −13.220 | 2.66 | | |
| 18 | −8.278 | 1.30 | 1.65095 | 59.0 |
| 19 | −2975.852 | | | |

| | W | T |
|---|---|---|
| $D_6$ | 3.00 | 10.10 |
| $D_{15}$ | 6.61 | 1.60 |
| f = 23.83–87.05 | | $F_{NO}$ = 5.7–9.9 |

Table 8 shows the values of K, $a_4$, $a_6$, $a_8$ and $a_{10}$ in Equation (A), above, for the aspherical surfaces indicated in Table 7.

Table 10 shows the values of K, $a_4$, $a_6$, $a_8$ and $a_{10}$ in Equation (A), above, for the aspherical surface indicated in Table 9.

TABLE 8

| # | K | $a_4$ | $a_6$ | $a_8$ | $a_{10}$ |
|---|---|---|---|---|---|
| 14 | 1.0041970 | −0.8273031 × 10⁻⁴ | −0.2718273 × 10⁻⁶ | −0.4449231 × 10⁻⁸ | −0.3093850 × 10⁻¹⁰ |
| 15 | 0.7290926 | 0.5020327 × 10⁻⁴ | 0.3850547 × 10⁻⁶ | 0.7653821 × 10⁻⁸ | 0.6114085 × 10⁻¹⁰ |
| 16 | −0.4018526 | 0.3046138 × 10⁻⁴ | 0.3287957 × 10⁻⁷ | −0.4369362 × 10⁻⁸ | −0.6376424 × 10⁻¹⁰ |
| 17 | 1.2510331 | −0.2863407 × 10⁻⁴ | −0.1157070 × 10⁻⁶ | −0.1121402 × 10⁻⁸ | −0.8940307 × 10⁻¹⁰ |

TABLE 10

| # | K | $a_4$ | $a_6$ | $a_8$ | $a_{10}$ |
|---|---|---|---|---|---|
| 14 | 1.0310814 | $-0.7439525 \times 10^{-4}$ | $-0.7309457 \times 10^{-6}$ | $-0.1066711 \times 10^{-7}$ | $-0.8273085 \times 10^{-10}$ |
| 15 | -0.0216163 | $0.1339037 \times 10^{-3}$ | $0.5987307 \times 10^{-6}$ | $0.8316756 \times 10^{-8}$ | $0.8501584 \times 10^{-10}$ |
| 16 | -1.7491174 | $0.1024361 \times 10^{-3}$ | $0.1383846 \times 10^{-5}$ | $0.1076929 \times 10^{-7}$ | $0.1913501 \times 10^{-9}$ |
| 17 | 1.3577400 | $0.1406197 \times 10^{-4}$ | $-0.8046605 \times 10^{-6}$ | $0.2367099 \times 10^{-8}$ | $0.2409800 \times 10^{-9}$ |

FIGS. 6, 8, 10, 12 and 14 show, for Embodiments 1–5, respectively, the spherical aberration, astigmatism with respect to the sagittal (S) and the tangential (T) image surfaces, and distortion, at the wide-angle end of the three-group zoom lens of the invention. And, FIGS. 7, 9, 11, 13 and 15 show, for Embodiments 1–5, respectively, the spherical aberration, astigmatism with respect to the sagittal (S) and the tangential (T) image surfaces, and distortion at the telephoto end of the three-group zoom of the invention. As is clearly shown in these aberration figures, the various aberrations are favorably corrected in each Embodiment of the invention at both the wide-angle end and the telephoto end. Moreover, the three-group zoom lens in each embodiment mentioned above has an image angle of 70 degrees or more at the wide-angle end, an $F_{NO}$ of less than 10 at the telephoto end, and a variable zoom ratio of 3.6 or more.

The present invention provides a compact three-group zoom lens which provides a bright image at the wide-angle end; a wide image angle at the wide-angle end, and in which the overall length of the zoom lens at the telephoto end is short. Moreover, the various aberrations are favorably corrected so as to provide optical performance having high resolution and high contrast over the entire range of zoom.

The invention being thus described, it will be obvious that the same may be varied in many ways. For example, the shape of lens elements in each lens group, the number of aspherical surfaces, and the shape of the aspherical surfaces can be appropriately selected. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A three-group zoom lens comprising, in order from the object side:

a first lens group having positive refractive power;

a diaphragm;

a second lens group having positive refractive power; and, and a third lens group having negative refractive power; wherein the diaphragm is positioned nearest the second lens group and zooming is performed by changing the spacings between the lens groups such that, when power is varied from the wide-angle end to the telephoto end, the distance between the first lens group and the second lens group increases, while the distance between the second lens group and the third lens group decreases; and, the second lens group includes, in order from the object side, a meniscus lens element having negative refractive power with its concave surface on the object side, a biconvex lens element, and a lens element having negative refractive power.

2. The three-group lens of claim 1, wherein said second lens group further includes a biconvex lens element on the image side of said lens element having negative refractive power.

3. The three-group zoom lens of claim 1, wherein the third lens group includes a lens element having at least one aspherical surface.

4. The three-group zoom lens of claim 1, wherein the lens element of the second lens group that is nearest the image side has an aspherical surface.

5. The three-group zoom lens as set forth in claim 1, and further having construction values as set forth below:

| # | R | D | $N_d$ | $v_d$ |
|---|---|---|---|---|
| 1 | 33.366 | 4.55 | 1.57698 | 40.6 |
| 2 | -48.979 | 0.35 | | |
| 3 | -31.251 | 1.03 | 1.83400 | 29.9 |
| 4 | 109.027 | 0.10 | | |
| 5 | 9.890 | 1.06 | 1.49000 | 62.3 |
| 6 | 18.073 | $D_6$ | | |
| 7 | ∞ | 1.45 | | |
| 8 | -7.569 | 1.00 | 1.58583 | 61.7 |
| 9 | -10.746 | 0.10 | | |
| 10 | 15.551 | 1.99 | 1.48749 | 70.4 |
| 11 | -16.559 | 0.72 | | |
| 12 | -318.548 | 1.00 | 1.83400 | 28.0 |
| 13 | 24.285 | 0.40 | | |
| 14 | 83.925 | 1.66 | 1.78351 | 25.8 |
| 15 | -21.065 | $D_{15}$ | | |
| 16 | -8.448 | 1.01 | 1.49023 | 57.5 |
| 17 | -15.226 | 0.14 | | |
| 18 | -12.291 | 1.00 | 1.68813 | 57.1 |
| 19 | -350.071 | | | | where # is the surface number, in order from the object side, R is the radius of curvature near the optical axis (in mm) of each surface, D is the on-axis spacing (in mm) of each surface, $N_d$ is the index of refraction (at the sodium d line), $v_d$ is the Abbe constant of each lens element, $D_6$ is in the range 3.49–12.40, and $D_{15}$ is in the range 8.94–1.68.

6. The three-group zoom lens as set forth in claim 1, and further having construction values as set forth below:

| # | R | D | $N_d$ | $v_d$ |
|---|---|---|---|---|
| 1 | 36.641 | 4.48 | 1.56006 | 43.9 |
| 2 | -51.728 | 1.10 | | |
| 3 | -28.101 | 1.00 | 1.83237 | 38.1 |
| 4 | 71.701 | 0.10 | | |
| 5 | 9.630 | 1.00 | 1.49078 | 62.0 |
| 6 | 16.536 | $D_6$ | | |
| 7 | ∞ | 1.31 | | |
| 8 | -7.321 | 1.00 | 1.51117 | 64.2 |
| 9 | -10.713 | 0.10 | | |
| 10 | 15.692 | 2.27 | 1.48749 | 70.4 |
| 11 | -16.380 | 0.56 | | |
| 12 | -650.774 | 1.00 | 1.83400 | 23.3 |
| 13 | 28.169 | 0.50 | | |
| 14 | 102.170 | 1.77 | 1.77554 | 29.4 |
| 15 | -17.915 | $D_{15}$ | | |
| 16 | -9.277 | 1.00 | 1.49023 | 57.5 |
| 17 | -14.553 | 0.10 | | |

-continued

| # | R | D | $N_d$ | $v_d$ |
|---|---|---|---|---|
| 18 | −12.882 | 1.00 | 1.61840 | 60.4 |
| 19 | 205.326 | | | | where # is the surface number, in order from the object side, R is the radius of curvature near the optical axis (in mm) of each surface, D is the on-axis spacing (in mm) of each surface, $N_d$ is the index of refraction (at the sodium d line), $v_d$ is the Abbe constant of each lens element, $D_6$ is in the range 3.00–11.94, and $D_{15}$ is in the range 8.91–1.75.

7. The three-group zoom lens as set forth in claim 1, and further having construction values as set forth below:

| # | R | D | $N_d$ | $v_d$ |
|---|---|---|---|---|
| 1 | 31.123 | 3.23 | 1.66850 | 32.2 |
| 2 | −72.110 | 0.62 | | |
| 3 | −31.582 | 1.00 | 1.83400 | 27.3 |
| 4 | 70.055 | 0.10 | | |
| 5 | 8.418 | 1.15 | 1.49000 | 56.9 |
| 6 | 11.360 | $D_6$ | | |
| 7 | ∞ | 1.58 | | |
| 8 | −5.925 | 1.00 | 1.52050 | 64.2 |
| 9 | −7.552 | 0.10 | | |
| 10 | 14.617 | 2.48 | 1.48749 | 70.4 |
| 11 | −12.575 | 0.10 | | |
| 12 | −64.747 | 1.00 | 1.83400 | 29.8 |
| 13 | 34.265 | 0.33 | | |
| 14 | 143.365 | 1.42 | 1.80822 | 24.6 |
| 15 | −29.193 | $D_{15}$ | | |
| 16 | −10.585 | 1.00 | 1.49023 | 57.5 |
| 17 | −16.199 | 0.10 | | |
| 18 | −13.745 | 1.00 | 1.61187 | 60.7 |
| 19 | 183.207 | | | | where # is the surface number, in order from the object side, R is the radius of curvature near the optical axis (in mm) of each surface, D is the on-axis spacing (in mm) of each surface, $N_d$ is the index of refraction (at the sodium d line), $v_d$ is the Abbe constant of each lens element, $D_6$ is in the range 3.03–11.81, and $D_{15}$ is in the range 10.16–1.60.

8. The three-group zoom lens as set forth in claim 1, and further having construction values as set forth below:

| # | R | D | $N_d$ | $v_d$ |
|---|---|---|---|---|
| 1 | 34.447 | 5.52 | 1.69994 | 30.0 |
| 2 | 496.420 | 2.34 | | |
| 3 | −38.298 | 1.11 | 1.83400 | 23.3 |
| 4 | 109.725 | 0.10 | | |
| 5 | 11.352 | 1.00 | 1.51810 | 51.6 |
| 6 | 20.873 | $D_6$ | | |
| 7 | ∞ | 0.18 | | |
| 8 | −16.590 | 1.00 | 1.83400 | 44.4 |
| 9 | −26.528 | 0.38 | | |
| 10 | 12.049 | 4.36 | 1.48749 | 70.4 |
| 11 | −41.066 | 0.11 | | |
| 12 | −201.639 | 1.00 | 1.83400 | 27.1 |
| 13 | 49.540 | 0.86 | | |
| 14 | 53.517 | 1.76 | 1.73923 | 28.0 |
| 15 | −22.517 | $D_{15}$ | | |
| 16 | −8.204 | 1.00 | 1.49023 | 57.5 |
| 17 | −14.161 | 0.10 | | |
| 18 | −12.110 | 1.00 | 1.69742 | 56.6 |
| 19 | −216.911 | | | | where # is the surface number, in order from the object side, R is the radius of curvature near the optical axis (in mm) of each surface, D is the on-axis spacing (in mm) of each surface, $N_d$ is the index of refraction (at the sodium d line), $v_d$ is the Abbe constant of each lens element, $D_6$ is in the range 3.25–14.08, and $D_{15}$ is in the range 8.50–1.60.

9. The three-group zoom lens as set forth in claim 1, and further having construction values as set forth below:

| # | R | D | $N_d$ | $v_d$ |
|---|---|---|---|---|
| 1 | 28.717 | 1.00 | 183400 | 23.3 |
| 2 | 246.598 | 0.63 | | |
| 3 | −34.250 | 2.50 | 1.83400 | 32.8 |
| 4 | 19.452 | 0.10 | | |
| 5 | 10.588 | 1.89 | 1.49000 | 65.4 |
| 6 | 167.307 | $D_6$ | | |
| 7 | ∞ | 1.91 | | |
| 8 | −7.153 | 1.00 | 1.73516 | 54.5 |
| 9 | −10.548 | 0.10 | | |
| 10 | 12.048 | 2.38 | 1.49000 | 65.4 |
| 11 | −21.995 | 0.10 | | |
| 12 | 120.864 | 1.00 | 1.83400 | 26.0 |
| 13 | 15.714 | 0.18 | | |
| 14 | 20.456 | 2.17 | 1.63071 | 34.9 |
| 15 | −13.215 | $D_{15}$ | | |
| 16 | −10.978 | 2.00 | 1.49588 | 65.2 |
| 17 | −13.220 | 2.66 | | |
| 18 | −8.278 | 1.30 | 1.65095 | 59.0 |
| 19 | −2975.852 | | | | where # is the surface number, in order from the object side, R is the radius of curvature near the optical axis (in mm) of each surface, D is the on-axis spacing (in mm) of each surface, $N_d$ is the index of refraction (at the sodium d line), $v_d$ is the Abbe constant of each lens element, $D_6$ is in the range 3.00–10.10, and $D_{15}$ is in the range 6.61–1.60.

* * * * *

UNITED STATES PATENT AND TRADEMARK OFFICE
CERTIFICATE OF CORRECTION

PATENT NO. : 6,043,939
DATED : Mar. 28, 2000
INVENTOR(S) : Toyama

It is certified that error appears in the above-indentified patent and that said Letters Patent is hereby corrected as shown below:

In column 1: at line 43, change "filly" to -- fully --;
In column 2: at line 36, change "lens 15, groups" to -- lens groups --;
at line 51, change "0.75" to --  -0.75 --;
In column 4: at line 9, change "$D_6$" to -- $D_{15}$ --;
in Table 1, change $N_d$ for surface #10 from "1.43749" to -- 1.48749 --;
at line 61, change "L," to -- $L_9$, --;
In column 5: at line 12, change "wide-angle" to -- wide-angle end W --;
at line 14, change "the angle" to -- the image angle --;
In column 6: at line 16, change "wide-angle" to -- wide-angle end W --;
at line 18, change "the angle" to -- the image angle --;
in Table 5, change $N_d$ for surface #14 from "1.30822" to -- 1.80822 --;
In column 7: at line 15, change "the of" to -- the value of --;
at line 17, change "of the" to -- of $D_{15}$ (the --;
at line 20 change "wide-angle" to -- wide-angle end W --;
at line 22, change "the angle" to -- the image angle --;
in Table 7, change $N_d$ for surface #10 from "1.43749" to -- 1.48749 --;
In column 8: at line 21, change "wide-angle W" to -- wide-angle end W --;
at line 50, change "surface" to -- surfaces --;

UNITED STATES PATENT AND TRADEMARK OFFICE
CERTIFICATE OF CORRECTION

PATENT NO. : 6,043,939
DATED : Mar. 28, 2000
INVENTOR(S) : Toyama

It is certified that error appears in the above-indentified patent and that said Letters Patent is hereby corrected as shown below:

In claim 9: change the value of $N_d$ for surface #1 from "183400" to -- 1.83400 --.

Signed and Sealed this

Sixth Day of March, 2001

Attest:

NICHOLAS P. GODICI

Attesting Officer     Acting Director of the United States Patent and Trademark Office